United States Patent [19]
Daur et al.

[11] Patent Number: 6,167,456
[45] Date of Patent: Dec. 26, 2000

[54] SYSTEM AND PROCESS FOR CONTROLLING INPUT AND OUTPUT DEVICES BY FILE SYSTEM DEVICES

[75] Inventors: Harald Daur, Esslingen; Ronald Pfeifer, Nufringen, both of Germany

[73] Assignee: International Business Machines Corporation, Armonk, N.Y.

[21] Appl. No.: 09/066,002

[22] Filed: Apr. 24, 1998

[30] Foreign Application Priority Data

May 6, 1997 [DE] Germany ............................ 197 19 055

[51] Int. Cl.⁷ .................................................. G06F 13/00
[52] U.S. Cl. ............................................. 709/321; 709/12
[58] Field of Search .................................... 709/321–324, 709/320, 327, 328, 329; 710/5, 15, 20, 36

[56] References Cited

U.S. PATENT DOCUMENTS

| | | |
|---|---|---|
| 5,508,821 | 4/1996 | Murata ..................................... 358/442 |
| 5,596,753 | 1/1997 | Bhatt ....................................... 709/302 |
| 5,671,340 | 9/1997 | Chapman et al. ....................... 395/101 |
| 5,764,866 | 6/1998 | Maniwa ................................... 395/114 |
| 5,862,297 | 1/1999 | Timmermans ............................ 386/70 |
| 5,907,835 | 5/1999 | Yokomizo et al. ......................... 707/1 |
| 5,911,044 | 6/1999 | Lo et al. .................................. 709/203 |
| 5,915,106 | 6/1999 | Ard ...................................... 395/500.44 |
| 5,928,337 | 7/1999 | Wieringa ..................................... 710/5 |
| 5,938,738 | 8/1999 | Mu-Teng ................................. 709/301 |
| 6,003,093 | 12/1999 | Kester ..................................... 709/301 |
| 6,036,094 | 3/2000 | Goldman ............................. 235/462.45 |

OTHER PUBLICATIONS

Marc J. Rochkind, Advanced UNIX Programming, 1985, pp. 2–4, 89–90.

*Primary Examiner*—Christopher B. Shin
*Attorney, Agent, or Firm*—Scully, Scott, Murphy & Presser

[57] ABSTRACT

The present invention describes a system and process for controlling input and output devices, in particular scanners or cameras, through application programs, where each input or output device can communicate with every application without modification of or addition to the application program and/or the input or output device software. For this, the input or output device is announced to the operating system by way of the application program as a file. The input or output device is started by means of the application program's "Open file" function. The input or output device is announced to the operating system as a drive. A data management function takes over the communication with the driver software for the input and output as well as for the preparation of the required image formats. In this way the data access functions of the application for enabling the reading of data from files are eliminated and, in addition, its own functions for accessing input or output devices through a special interface.

20 Claims, 3 Drawing Sheets

SYSTEM AND PROCESS FOR CONTROLLING INPUT AND OUTPUT DEVICES BY FILE SYSTEM DEVICES

BACKGROUND OF THE INVENTION

1. Technical Field

The present invention relates to a system and process for controlling input and output devices, particularly scanners or cameras, by means of programs, particularly application programs.

2. Prior Art

In connecting scanners to application software already on the market the problem often arises that the use of the connected scanner must be individually supported. Conventionally, application programs are developed in such a way that they have a standardized interface (e.g. TWAIN) to commercially available scanners.

However, if a new scanner which is not known to the existing application comes onto the market, extensive matching of the application and driver software has to be carried out.

This requires that the application developer match his application subsequently to the new scanner so that the new scanner can be supported by this application. The same applies to the scanner manufacturer in respect of his driver software. These software adaptations are very extensive and complicated and are also difficult to test.

SUMMARY OF THE INVENTION

It is therefore an object of the present invention to prepare a system and process which will enable any program to be connected to any scanner without the standardised programs requiring to be adapted individually to the new scanner.

Accordingly, the present invention is directed to a process for controlling input and output devices, particularly a scanner, by means of a program, wherein said input and output devices are controlled by the file interfaces of the program.

The present invention is further directed to a system for controlling a scanner by way of an application program, comprising at least one application program by means of which the input/output device is controlled; an operating system; and a scanner; wherein said scanner is controllable by way of the data interface of the application.

The present invention further relates to a medium containing a program for controlling a process as described above.

The advantage of the present invention resides in the fact that file access functions already used in the application are employed to control the scanner. Adapting the application program to support the new scanner is therefore no longer necessary. It is possible without adapting the current application to support different image formats (e.g. BITMAP, TIFF, JPEG).

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
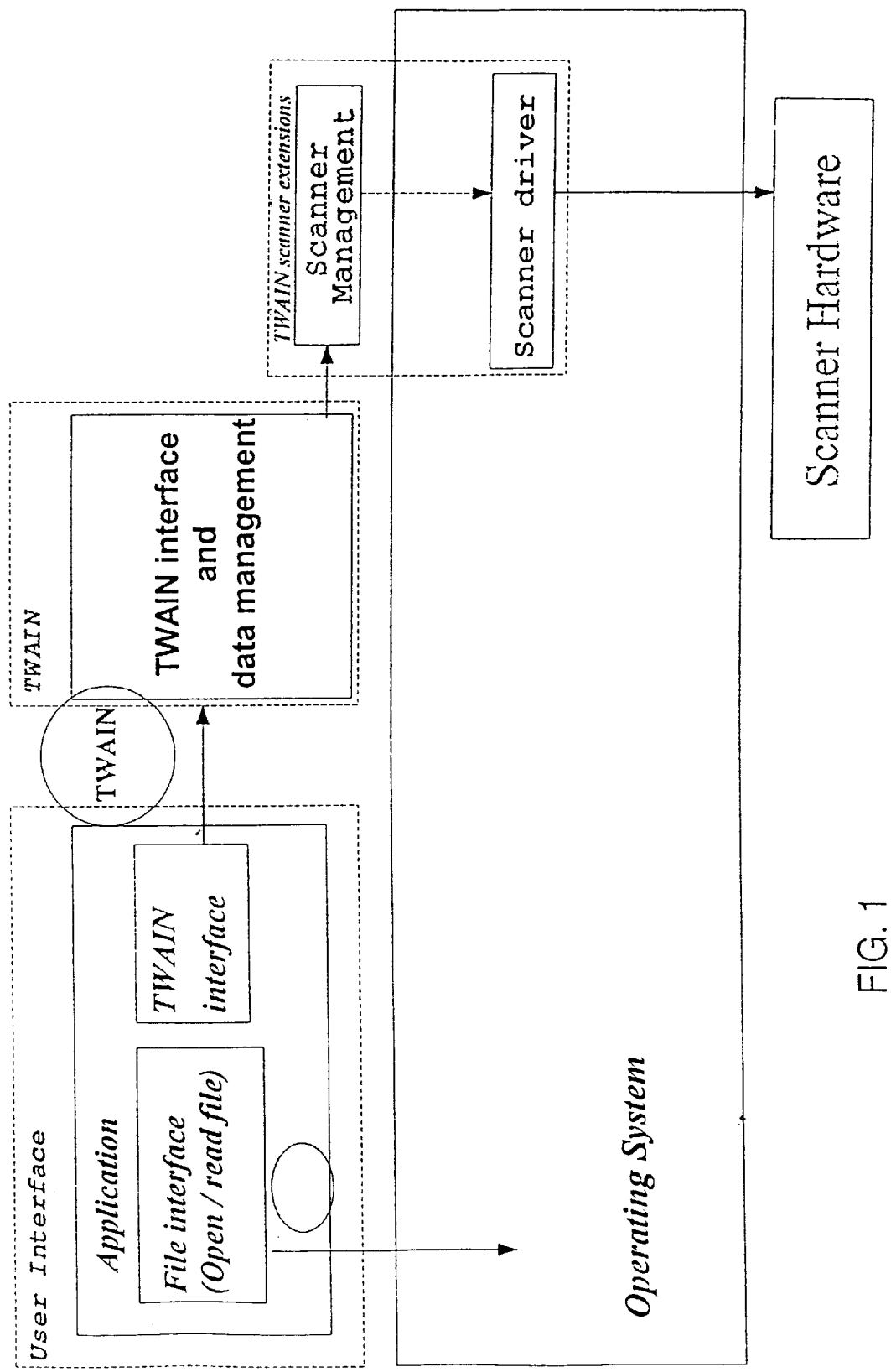
FIG. 1 shows an architecture of a system for controlling a scanner by means of a program, as currently implemented in the state of the art

FIG. 1 shows the architecture known in the art for connecting a scanner to applications. In the state of the art the application requires on the one hand a file access function of the operating system in order to read image data from files and on the other hand separate functions in order, for example, to access the scanner through a TWAIN interface. In addition, a hardware-specific driver software is required which supports the TWAIN interface.

The TWAIN architecture, which is very complex in its interface, requires special functions within the application and the driver software. The application takes over the function of conversion into the required image format.

Figure 2:
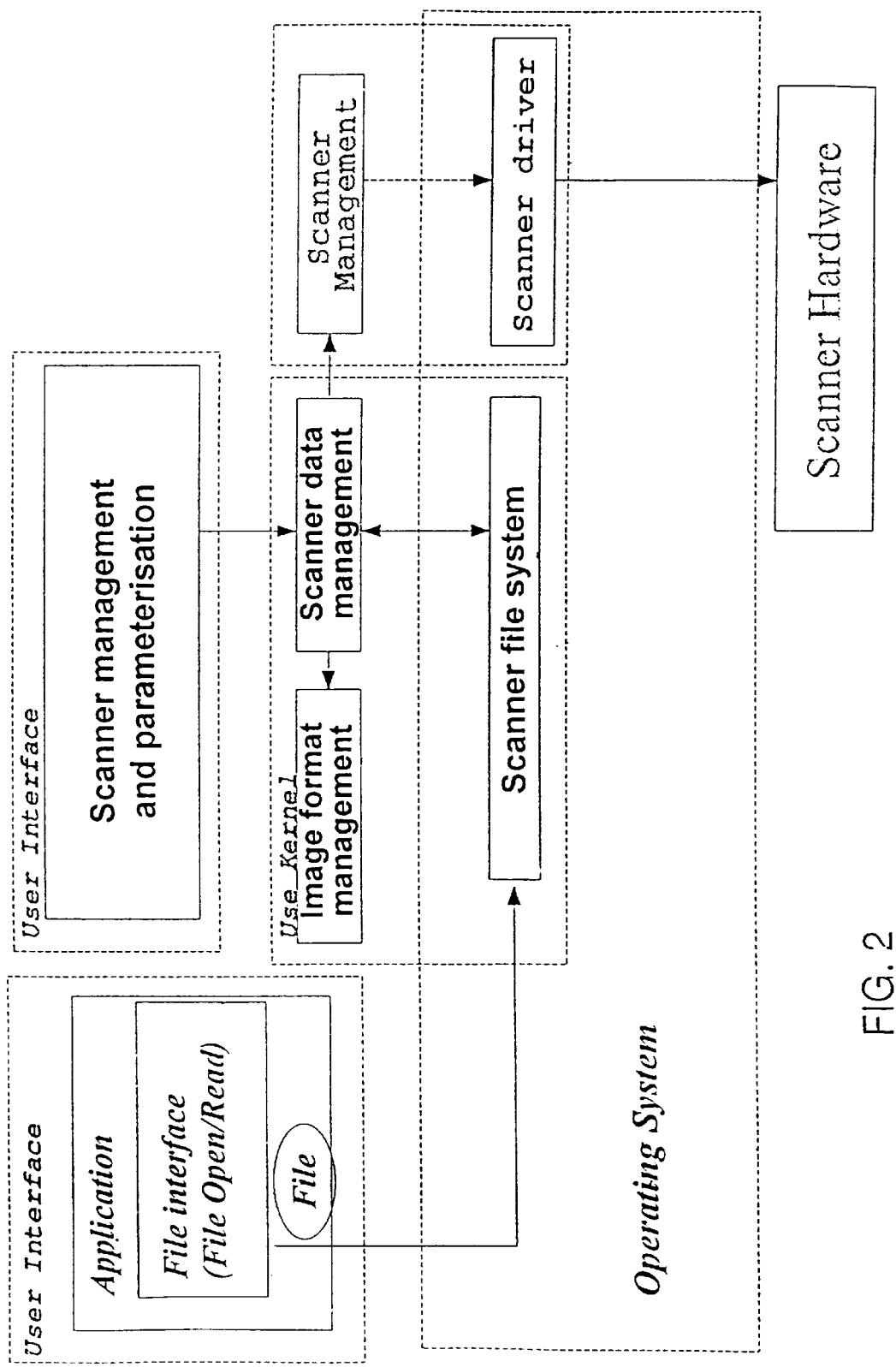
FIG. 2 shows the architecture in accordance with the invention for controlling a scanner by means of an application

FIG. 2 shows the main features of the architecture in accordance with the invention.

For this, the file interface (via File System Services) present in every application is used to carry the image data from the scanner to the application. To do this the scanner is presented to the application as a file. The command "File Open" then initiates the scanning process. The application does not therefore require any dedicated access function as it does, for example, under the TWAIN architecture.

In this way it is possible for any application, even those which do not have scanner support, to have access to the scanner through the file interface.

For this, the scanner is presented to the operating system as a file of a special drive. The scanner file system, together with the scanner data management system, forms the interface for the scanner driver software. Thus the scanner data management takes over both the communication with the scanner driver and also the preparation of the image format requested (e.g. BITMAP, TIFF, JPEG) through the image format management.

The scanner management and parameterising serves for the installation of the logical scanner with the corresponding setting of the parameters, such as, for example, depth of colour, image size, brightness and contrast, etc. For this, a physical scanner can be set up as several logical scanners in the scanner management. One logical scanner can be assigned a defined set of scanner parameters. Thus the logical scanner can be devoted to, e.g. "colour scanner, black and white scanner, DIN A4 scanner" etc. Thus, with existing image formats and the number of defined logical scanners, where each individual logical scanner stands for a particular set of parameters (depth of shade, image size, etc.), a number of possible combinations are provided which are represented to any application as files. This also applies to the applications, which generally do not have any scanner support, in so far as they are in a position to process image data, such as, for example, image or text processing programs. A particular aspect of the present invention resides in the fact that the interface is integrated in the operating system in such a way that standard functions of the operating system are invoked in order to serve the scanner. With TWAIN architecture, on the other hand, the interface is realised with separate special programs.

Figure 3:
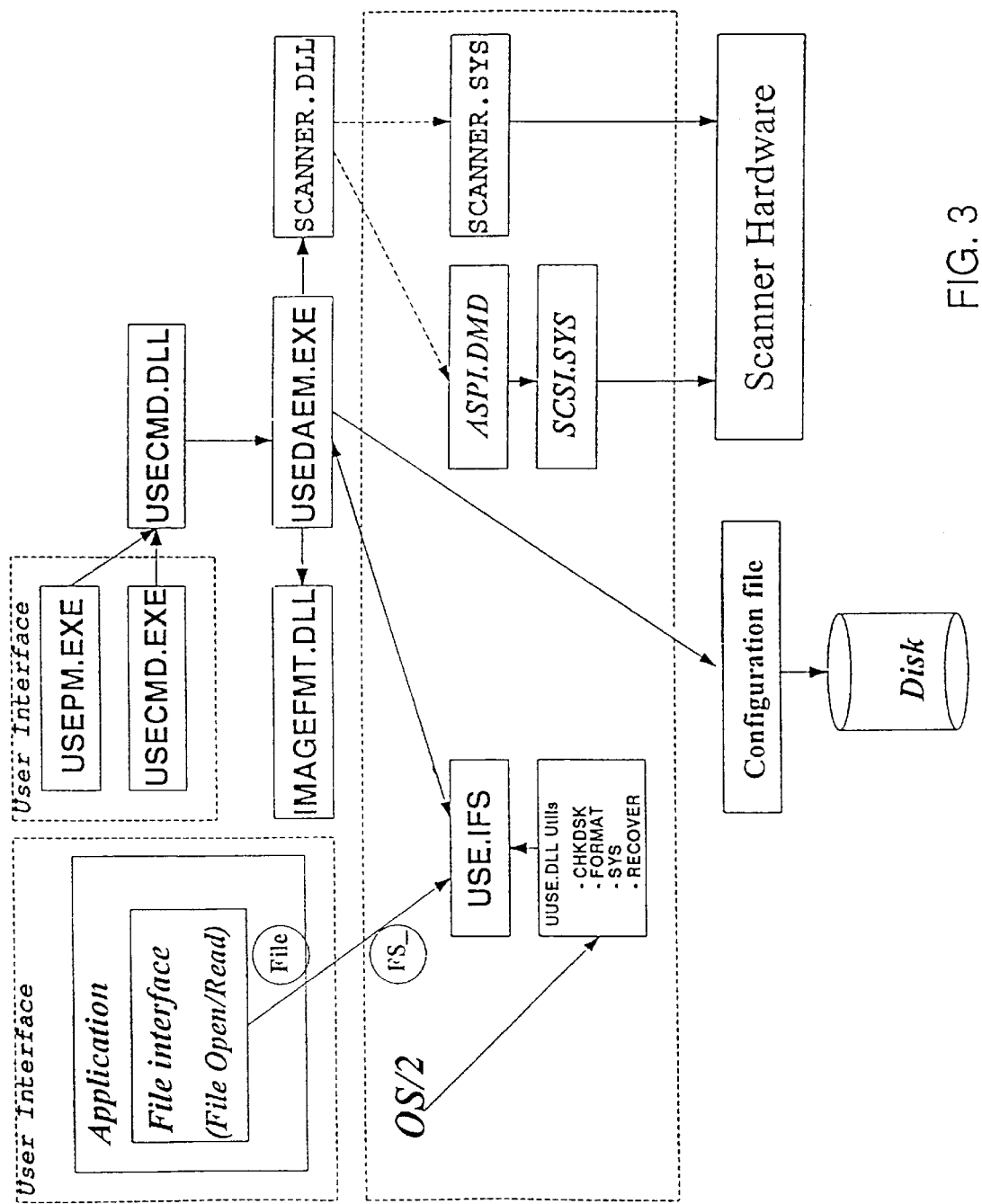
FIG. 3 shows a preferred embodiment for controlling a scanner by means of an application under the OS/2 operating system.

FIG. 3 shows a preferred embodiment of the present invention under the OS/2 operating system. The application, which is generally a graphics or text processing program, contains a file interface (File System Services). The scanner is announced to the operating system as a file of a special drive. The application initiates the scanning process through the function "File Open". Here the "USE.IFS" component, which represents a installable file system, emulates a file interface. For the OS/2 operating system cited by way of example the scanner represents a file of a special drive. Since "USE.IFS" is defined as a remote file system, the special drive can be amended or deleted dynamically during the execution of operations. The drive-like behaviour of the "USE.IFS" component gives any application the ability to access any desired scanner by opening/reading by way of files, in the same way as an actual file on a drive or hard disk.

The component "UUSE.DLL UTILS" supports the file system commands, such as "CHKDSK, FORMAT, RECOVER and SYS" in a scanner-specific manner. "FS-Helper" are file system help functions. The component "IMAGEFMT.DLL" supports the various image formats. By this means the scanned data are converted to the appropriate image format (e.g. "BMP" or "TIFF").

The component "Scanner DLL" adapts the individual scanner hardware. It converts the data from the "USEDAEM.EXE" interface into the scanner-specific driver interface. A name is communicated for each scanner supported (e.g. "HHSCAN", "IBM 2456"). The "USEDAEM.EXE" Scanner Data Management component performs various functions. It reads the configuration data from the configuration file, loads the configured scanner DLLS, loads the configured image format DLLs and produces scanner objects. For example, the following scanner objects can be produced:

HHSCAN.BMP stands for a hand-held scanner with BMP image formatting.
HHSCANN.TIF stands for a hand-held scanner with TIFF image formatting.
IBM2456.BMP stands for an IBM 2456 scanner with BMP image formatting.
IBM2456.TIFF stands for an IBM 2456 scanner with TIFF image formatting.
\GRAU\HHSCAN.BMP stands for a hand-held scanner with BMP image formatting and "Grey" scale.
\GRAU\Breit\HHSCANN.TIFF stands for a hand-held scanner with TIFF image formatting and "Grey" scale and a wide scanner setting.

The "USE.IFS" component sends requirements of the application to the "USEDAEM.EXE" component. In the case of "Open a file" the scanner starts and the data are brought to a uniform data format through the Scanner DLL component. The data are subsequently converted to the desired image format and sent to the application through the "USE.IFS" component.

A further component is the "USECMD.EXE", which essentially forms the graphics command user interface for scanner management and parameterising.

The installation of new scanners or even new image formats is effected by adding new scanner or image formatting names to the configuration file.

The process in accordance with the invention as shown in FIG. 3, is briefly described as follows:

The scanner is introduced to the operating system, through the installable file system "USE.IFS", as a file on a special drive. The user can control the scanner from his application by way of the "File open/Read" function through this "USE.IFS" file interface. This control requirement is passed on to the scanner file management function "USEDAEM.EXE" which sets the appropriate scanner parameters and image formats. The scanner is then started. The data provided from the scanner are sent to the component "IMAGEFMT.DLL", where the data are converted to the appropriate set image format.

The entry "Open file" is confirmed and is notified to the application through the component "USE.IFS". The application now carries out the requirement "Read data", which is provided to the component "USEDAEM.EXE" through the "USE.IFS" component. The component "USEDAEM.EXE" supplies data to the application through "USE.IFS". The "File Read" requirement is then carried out when all data have been completely read by the application. Then the "File Close" requirement is carried out.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method for controlling a scanner device via a standard file interface of a program, said method comprising:
    a) presenting the scanner device to an operating system through an installable file system as one or more files;
    b) initiating scanning by opening one of the one or more files from the file interface of the program, the program generating a standard file control requirement responsive to the opening as defined by the operating system;
    c) converting the standard file control requirement generated by the program into a scanner device control requirement;
    d) operating the scanner device in accordance with the scanner device control requirement; and
    e) transmitting data from the scanner device to the program, wherein the program controls the scanner device without requiring adaptation of a standardized driver for the scanner device.

2. The method in accordance with claim 1, wherein the one or more files are part of a special drive.

3. The method in accordance with claim 1, wherein the installable file system is part of the operating system.

4. The method in accordance with claim 1, wherein each of the one or more files of the special drive represents a set of one or more scanner parameters made available to a user via the file interface of the program, said set selected from the group comprising: depth of color, depth of shade, brightness, contrast and image size.

5. The method in accordance with claim 4, wherein the one or more scanner parameters are stored in a configuration file.

6. The method in accordance with claim 1, wherein the step of converting further comprises:
    receiving the standard file control requirement by a scanner data management function, the scanner data management function translating the standard file control requirement into the scanner device control requirement and transmitting the scanner device control to the scanner device.

7. The method in accordance with claim 1, wherein the step of transmitting further comprises:
    receiving the data from the scanner device by a scanner data management function, the scanner data management function converting the data according to an image format selected from one or more predetermined image formats set in an image manager.

8. The method in accordance with claim 1, wherein the program is an application program.

9. The method in accordance with claim 7, wherein the data management function provides a user with a graphics user interface for scanner management and scanner adjustment.

10. A system for controlling a scanner device via a standard file interface of a program, said system comprising:
   a) a scanner device presented to an operating system through an installable file system as one or more files;
   b) a program initiating scanning by opening one of the one or more files from the standard file interface of the program and generating a control requirement;
   c) a data management function providing conversion and transmission of the control requirement from the program to the scanner device, and providing conversion and transmission of scanned data from the scanner to the program;
   d) wherein the program controls the scanner device without requiring adaptation of a standardized driver for the scanner device.

11. The system in accordance with claim 10, wherein the one or more files are part of a special drive.

12. The system in accordance with claim 10, wherein the installable file system is part of the operating system.

13. The system in accordance with claim 10, wherein each of the one or more files of the special drive represents a set of one or more scanner parameters made available to a user via the file interface of the program, said set selected from the group comprising: depth of color, depth of shade, brightness, contrast and image size.

14. The system in accordance with claim 13, wherein the one or more scanner parameters are stored in a configuration file.

15. The system in accordance with claim 10, wherein the scanner data management function receives the standard file control requirement, translates the standard file control requirement into the scanner device control requirement and transmits the scanner device control to the scanner device.

16. The system in accordance with claim 10, wherein the scanner data management function receives the data from the scanner device, converts the data according to an image format selected from one or more predetermined image formats set in an image manager.

17. The system in accordance with claim 10, wherein the program is an application program.

18. The system in accordance with claim 16, wherein the data management function provides a user with a graphics user interface for scanner management and scanner adjustment.

19. A program storage device readable by machine, tangibly embodying a program of instructions executable by the machine to perform the method steps for controlling a scanner device via a standard file interface of a program, the method steps comprising:
   a) presenting the scanner device to an operating system through an installable file system as one or more files;
   b) initiating scanning by opening one of the one or more files from the file interface of the program, the program generating a standard file control requirement in response to the opening as defined by the operating system;
   c) converting the standard file control requirement generated by the program into a scanner device control requirement;
   d) operating the scanner device in accordance with the scanner device control requirement; and
   e) transmitting data from the scanner device to the program, wherein the program controls the scanner device without requiring adaptation of a standardized driver for the scanner device.

20. The program storage device in accordance with claim 19, wherein the one or more files are part of a special drive.

* * * * *